United States Patent
Tanaka

(10) Patent No.: US 10,115,549 B2
(45) Date of Patent: Oct. 30, 2018

(54) ELECTRICAL STORAGE SYSTEM

(71) Applicant: TOYOTA JIDOSHA KABUSHIKI KAISHA, Toyota-shi, Aichi-ken (JP)

(72) Inventor: Hiromasa Tanaka, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 393 days.

(21) Appl. No.: 15/021,458

(22) PCT Filed: Sep. 9, 2014

(86) PCT No.: PCT/IB2014/001765
§ 371 (c)(1),
(2) Date: Mar. 11, 2016

(87) PCT Pub. No.: WO2015/036830
PCT Pub. Date: Mar. 19, 2015

(65) Prior Publication Data
US 2016/0225564 A1    Aug. 4, 2016

(30) Foreign Application Priority Data

Sep. 13, 2013  (JP) ................................. 2013-191214

(51) Int. Cl.
*H01H 47/22* (2006.01)
*H01H 47/14* (2006.01)
(Continued)

(52) U.S. Cl.
CPC ............ *H01H 47/22* (2013.01); *H01H 47/14* (2013.01); *H01H 50/20* (2013.01); *H01H 50/54* (2013.01);
(Continued)

(58) Field of Classification Search
CPC ........ H01H 47/22; H01H 47/14; H01H 50/20; H01H 50/54; H01H 50/34; H02H 9/001
See application file for complete search history.

(56) References Cited

U.S. PATENT DOCUMENTS 5,119,261 A * 6/1992 Sonntagbauer ........ H01H 9/542
361/2
6,075,684 A * 6/2000 Duba ............... H03K 17/08142
361/4
(Continued)

FOREIGN PATENT DOCUMENTS

JP   2005-222871 A   8/2005

OTHER PUBLICATIONS

International Search Report for PCT/IB2014/001765 dated Jan. 26, 2015 [PCT/ISA/210].
(Continued)

*Primary Examiner* — Zeev V Kitov
(74) *Attorney, Agent, or Firm* — Sughrue Mion, PLLC

(57) ABSTRACT

An electrical storage system includes an electrical storage device, a load, a positive electrode line, a negative electrode line, a first relay, a second relay, a third relay, a drive circuit and a controller. The drive circuit includes a coil, a first power line, a second power line, and a sensor. The first power line includes a first switch element and a second switch element connected in series with each other. The second power line includes a second resistive element and a third switch element connected in series with each other. The drive circuit is configured to cause both the second and third relays and the first relay to operate at different timings. The controller is configured to control operation of the drive circuit. The controller is configured to output a control signal for setting each switch element to the non-energized state, and determine whether any one of the switch elements has
(Continued)

a failure in the energized state on the basis of the output signal of the sensor.

6 Claims, 12 Drawing Sheets

(51) Int. Cl.
    *H02H 3/04*     (2006.01)
    *H02H 9/00*     (2006.01)
    *H01H 50/20*     (2006.01)
    *H01H 50/54*     (2006.01)
    *H01H 50/34*     (2006.01)

(52) U.S. Cl.
    CPC ............ *H02H 3/044* (2013.01); *H02H 9/001* (2013.01); *H01H 50/34* (2013.01)

(56) References Cited

U.S. PATENT DOCUMENTS

| | | | |
|---|---|---|---|
| 7,269,535 B2* | 9/2007 | Kishimoto | B60L 3/0023 702/182 |
| 7,508,645 B2* | 3/2009 | Trivette | H01H 33/6662 361/139 |
| 9,437,381 B2* | 9/2016 | Hassan-Ali | B60L 11/1818 |
| 2003/0137786 A1* | 7/2003 | Hasegawa | H02H 9/001 361/10 |
| 2012/0153638 A1* | 6/2012 | Shimizu | F02N 11/0851 290/38 R |

OTHER PUBLICATIONS

Written Opinion for PCT/IB2014/001765 dated Jan. 26, 2015 [PCT/ISA/237].

* cited by examiner

ELECTRICAL STORAGE SYSTEM

CROSS REFERENCE TO RELATED APPLICATIONS

This application is a National Stage of International Application No. PCT/IB2014/001765 filed Sep. 9, 2016, claiming priority based on Japanese Patent Application No. 2013-191214 filed Sep. 13, 2013, the contents of all of which are incorporated herein by reference in their entirety.

BACKGROUND OF THE INVENTION

1. Field of the Invention

The invention relates to an electrical storage system that is able to operate a plurality of relays together.

2. Description of Related Art

Japanese Patent Application Publication No. 2005-222871 (JP 2005-222871 A) describes a relay that operates a plurality of pairs of contacts with the use of a single drive mechanism (solenoid). Each pair of contacts is formed of a movable contact and a fixed contact. By switching between energized and non-energized states of the solenoid, each movable contact is able to contact a corresponding one of the fixed contacts or move away from the corresponding one of the fixed contacts in the plurality of pairs of contacts.

JP 2005-222871 A also describes a power supply circuit that connects a battery to a motor. In this power supply circuit, a positive-side main relay and a negative-side main relay are used. These main relays are the above-described pairs of contacts.

SUMMARY OF THE INVENTION

In order to switch between the energized and non-energized states of the solenoid, generally, a switch element is used. Specifically, when the switch element is set to an energized state (on state), it is possible to cause current to flow through the solenoid. When the switch element is set to a non-energized state (off state), it is possible to interrupt energization of the solenoid.

Here, if the switch element remains in the energized state because of a failure of the switch element, current continues flowing through the solenoid. Therefore, each movable contact continues contacting a corresponding one of the fixed contacts in the plurality of pairs of contacts. In the power supply circuit described in JP 2005-222871 A, the positive-side main relay and the negative-side main relay both remain in the energized state, so the battery remains connected to the motor.

If such a state occurs, for example, there is a concern that electric power continues being supplied from the motor to the battery and then the battery becomes an overcharged state. Therefore, it is required to determine whether the above-described switch element has a failure.

A first aspect of the invention provides an electrical storage system. The electrical storage system includes an electrical storage device, a load, a positive electrode line, a negative electrode line, a first relay, a second relay, a third relay, a drive circuit and a controller. The positive electrode line and the negative electrode line connect the electrical storage device to the load. The first relay is provided in the positive electrode line. The second relay is provided in the negative electrode line. The third relay is connected in series with a first resistive element. The third relay is connected in parallel with the first relay.

The drive circuit includes a coil, a first power line, a second power line, and a sensor. The coil is configured to generate electromagnetic force for switching the second relay and the third relay from a non-energized state to an energized state by energization at a first current value. The coil is configured to generate electromagnetic force for switching the first relay, the second relay and the third relay from a non-energized state to an energized state by energization at a second current value larger than the first current value. The first power line includes a first switch element and a second switch element connected in series with each other. The first power line is configured to supply current having the second current value from a power supply to the coil. The second power line includes a second resistive element and a third switch element connected in series with each other. The second power line is configured to supply current having the first current value from the power supply to the coil. The drive circuit is configured to cause both the second and third relays and the first relay to operate at different timings.

The first power line supplies current having the second current value larger than the first current value from the power supply to the coil. When current having the first current value is supplied to the coil, electromagnetic force for switching the second relay and the third relay from the non-energized state to the energized state is generated. When current having the second current value is supplied to the coil, electromagnetic force for switching the first relay, the second relay and the third relay from the non-energized state to the energized state is generated. By switching the current value that is supplied to the coil between the first current value and the second current value, it is possible to vary the timing at which the second relay and the third relay are operated from the timing at which the first relay is operated with the use of the single coil.

The sensor changes an output signal on the basis of whether each switch element is in the energized state or the non-energized state. The controller controls operation of the drive circuit, outputs a signal for setting each switch element to the non-energized state, and determines whether any one of the switch elements has a failure in the energized state on the basis of the output signal of the sensor.

By outputting the control signal for setting each switch element to the non-energized state and then monitoring the output signal of the sensor, it is possible to determine whether any one of the switch elements has a failure in the energized state. That is, when the output signal of the sensor indicates the energized state of the switch element although the switch element is controlled to the non-energized state, it may be determined that the switch element has a failure. When it may be determined that any one of the switch elements has a failure, it is possible to cope with the failure.

In the above aspect, the first switch element may be provided in the first power line between the power supply and the second switch element. The sensor may include a first voltage sensor and a second voltage sensor. The first voltage sensor may be configured to detect a voltage value between a ground and a connection point at which the first switch element and the second switch element are connected to each other. The second voltage sensor may be configured to detect a voltage value between the ground and a connection point at which the second switch element and the coil are connected to each other.

The controller may be configured to output a control signal for setting the first switch element to the energized state and a control signal for setting the second switch element to the non-energized state. The controller may be configured to determine that the second switch element has a failure in the energized state when the voltage value detected by the second voltage sensor is equal to a voltage value of the power supply. When the second switch element is normal, the voltage value detected by the second voltage sensor is substantially 0 [V]. However, when the second switch element has a failure in the energized state, the voltage value detected by the second voltage sensor is equal to the voltage value of the power supply. Thus, by monitoring the voltage value detected by the second voltage sensor, it is possible to determine whether the second switch element has a failure in the energized state.

The controller may be configured to output a control signal for setting the first switch element and the second switch element to the non-energized state. The controller may be configured to determine that the first switch element has a failure in the energized state when the voltage value detected by the first voltage sensor is equal to the voltage value of the power supply. When the first switch element is normal, the voltage value detected by the first voltage sensor is substantially 0 [V]. However, when the first switch element has a failure in the energized state, the voltage value detected by the first voltage sensor is equal to the voltage value of the power supply. Thus, by monitoring the voltage value detected by the first voltage sensor, it is possible to determine that the first switch element has a failure in the energized state.

In the above aspect, the first switch element may be provided in the first power line between the power supply and the second switch element. The sensor may include a voltage sensor configured to detect a voltage value between a ground and a connection point at which the second switch element and the coil are connected to each other.

The controller may be configured to output a control signal for setting the first switch element to the non-energized state and a control signal for setting the second switch element to the energized state. The controller may be configured to determine that the first switch element has a failure in the energized state when the voltage value detected by the voltage sensor is equal to a voltage value of the power supply. When the first switch element is normal, the voltage value detected by the voltage sensor is substantially 0 [V]. However, when the first switch element has a failure in the energized state, the voltage value detected by the voltage sensor is equal to the voltage value of the power supply. Thus, by monitoring the voltage value detected by the voltage sensor, it is possible to determine that the first switch element has a failure in the energized state.

The controller may be configured to output a control signal for setting the first switch element to the energized state and a control signal for setting the second switch element to the non-energized state. The controller may be configured to determine that the second switch element has a failure in the energized state when the voltage value detected by the voltage sensor is equal to the voltage value of the power supply. When the second switch element is normal, the voltage value detected by the voltage sensor is substantially 0 [V]. However, when the second switch element has a failure in the energized state, the voltage value detected by the voltage sensor is equal to the voltage value of the power supply. Thus, by monitoring the voltage value detected by the voltage sensor, it is possible to determine whether the second switch element has a failure in the energized state.

In the above aspect, the first switch element may be provided in the first power line between the power supply and the second switch element. The sensor may include a current sensor provided in the first power line between the second switch element and the coil. The current sensor may be configured to detect an energized state of the first power line.

The controller may be configured to output a control signal for setting the first switch element to the non-energized state and a control signal for setting the second switch element to the energized state. The controller may be configured to determine that the first switch element has a failure in the energized state when a detected result of the current sensor indicates the energized state of the first power line. When the first switch element is normal, no current flows through the first power line. However, when the first switch element has a failure in the energized state, current flows through the first power line. Thus, by monitoring the detected result of the current sensor (the energized state of the first power line), it is possible to determine whether the first switch element has a failure in the energized state.

The controller may be configured to output a control signal for setting the first switch element to the energized state and a control signal for setting the second switch element to the non-energized state. The controller may be configured to determine that the second switch element has a failure in the energized state when a detected result of the current sensor indicates the energized state of the first power line. When the second switch element is normal, no current flows through the first power line. However, when the second switch element has a failure in the energized state, current flows through the first power line. Thus, by monitoring the detected result of the current sensor (the energized state of the first power line), it is possible to determine whether the second switch element has a failure in the energized state.

In the above aspect, the sensor may include a third voltage sensor configured to detect a voltage value between a ground and a part of the second power line, and the second power line may connect the second resistive element and the third switch element to the coil.

The controller may be configured to output a control signal for setting the third switch element to the non-energized state. The controller may be configured to determine that the third switch element has a failure in the energized state when the voltage value detected by the third voltage sensor is higher than the voltage value at the time when the third switch element is in the non-energized state and is lower than a voltage value of the power supply. When the third switch element is normal, the voltage value detected by the third voltage sensor is substantially 0 [V]. However, when the third switch element has a failure in the energized state, the voltage value detected by the third voltage sensor is higher than the voltage value (substantially 0 [V]) at the time when the third switch element is in the non-energized state and is lower than the voltage value of the power supply. When the third switch element is in the energized state, the voltage value detected by the third voltage sensor is lower than the voltage value of the power supply by the amount of voltage drop due to the resistance value of the second resistive element. Thus, by monitoring the voltage value detected by the third voltage sensor, it is possible to determine that the third switch element has a failure in the energized state.

The controller may be configured to output a control signal for setting the third switch element to the energized state. The controller may be configured to determine that the second resistive element has a failure in a decreased resistance state when the voltage value detected by the third voltage sensor is equal to the voltage value of the power supply. In the state where the resistance value of the second resistive element has decreased (decreased resistance state), no voltage drop due to the resistance value of the second resistive element occurs. Therefore, in the state where the resistance value of the second resistive element has decreased, the voltage value detected by the third voltage sensor is equal to the voltage value of the power supply. By determining this condition, it is possible to determine that the second resistive element has a failure. If the second resistive element fails, it is not possible to switch the current value that is supplied to the coil between the first current value and the second current value. Therefore, it is required to determine whether the second resistive element has a failure.

In the above aspect, the sensor may include a current sensor provided in the second power line, and the current sensor may be configured to detect an energized state of the second power line.

The controller may be configured to output a control signal for setting the third switch element to the non-energized state. The controller may be configured to determine that the third switch element has a failure in the energized state when a detected result of the current sensor indicates the energized state of the second power line. When it is determined whether the third switch element has a failure in the energized state, the controller outputs a control signal for setting the third switch element to the non-energized state. When the third switch element is normal, no current flows through the second power line. However, when the third switch element has a failure in the energized state, current flows through the second power line. Thus, by monitoring the detected result of the current sensor (the energized state of the second power line), it is possible to determine whether the third switch element has a failure in the energized state.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the invention is described.

Figure 1:
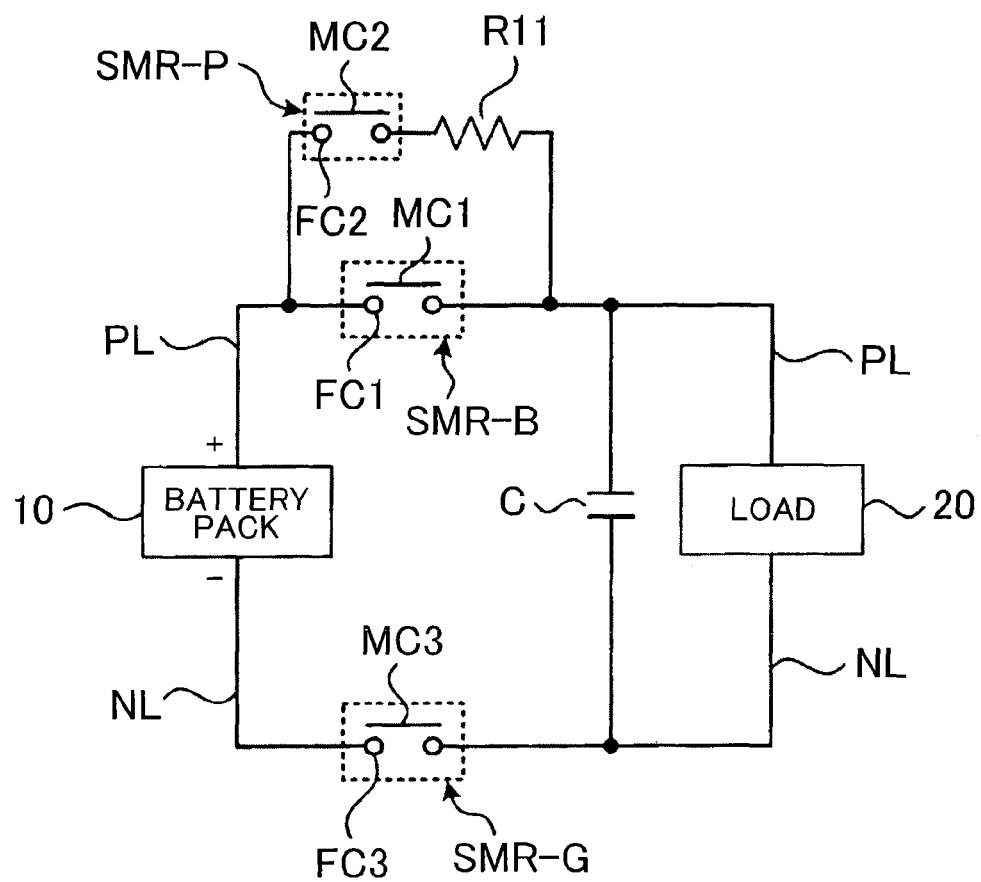
FIG. 1 is a view that shows the configuration of a battery system.

A battery system (which corresponds to an electrical storage system according to the invention) according to a first embodiment of the invention will be described with reference to FIG. 1. FIG. 1 is a schematic view that shows the configuration of the battery system according to the present embodiment.

A positive electrode line PL is connected to the positive electrode terminal of a battery pack (which corresponds to an electrical storage device according to the invention) 10. A negative electrode line NL is connected to the negative electrode terminal of the battery pack 10. The battery pack 10 includes a plurality of single cells. The number of the single cells of the battery pack 10 may be set as needed. Here, the plurality of single cells that constitute the battery pack 10 may be connected in series with each other or may be connected in parallel with each other.

Instead of the battery pack 10, only one single cell may be used. A secondary battery, such as a nickel-metal hydride battery and a lithium ion battery, may be used as each single cell. Instead of the secondary battery, an electric double layer capacitor may be used.

The battery pack 10 is connected to a load 20 via the positive electrode line PL and the negative electrode line NL. The load 20 operates upon reception of electric power from the battery pack 10. When the load 20 generates electric power, the battery pack 10 is allowed to be charged with the generated electric power. A capacitor C is connected to the positive electrode line PL and the negative electrode line NL. The capacitor C is used to smooth a voltage value between the positive electrode line PL and the negative electrode line NL.

A system main relay (which corresponds to a first relay according to the invention) SMR-B is provided in the positive electrode line PL. A system main relay (which corresponds to a third relay according to the invention) SMR-P and a resistive element (which corresponds to a first resistive element according to the invention) R11 are connected in parallel with the system main relay SMR-B. The system main relay SMR-P and the resistive element R11 are connected in series with each other.

The system main relay SMR-B has a movable contact MC1 and a fixed contact FC1. The fixed contact FC1 of the system main relay SMR-B is connected to the positive electrode line PL. When the movable contact MC1 contacts the fixed contact FC1, the system main relay SMR-B enters the on state. When the movable contact MC1 moves away from the fixed contact FC1, the system main relay SMR-B enters the off state.

The system main relay SMR-P has a movable contact MC2 and a fixed contact FC2. One end of the fixed contact FC2 of the system main relay SMR-P is connected to the positive electrode line PL. The other end of the fixed contact FC2 of the system main relay SMR-P is connected to the resistive element R11. When the movable contact MC2 contacts the fixed contact FC2, the system main relay SMR-P enters the on state. When the movable contact MC2 moves away from the fixed contact FC2, the system main relay SMR-P enters the off state. The resistive element R11 is used to inhibit flow of inrush current from the battery pack 10 to the capacitor C.

A system main relay (which corresponds to a second relay according to the invention) SMR-G is provided in the negative electrode line NL. The system main relay SMR-G has a movable contact MC3 and a fixed contact FC3. The fixed contact FC3 of the system main relay SMR-G is connected to the negative electrode line NL. When the movable contact MC3 contacts the fixed contact FC3, the system main relay SMR-G enters the on state. When the movable contact MC3 moves away from the fixed contact FC3, the system main relay SMR-G enters the off state.

In the present embodiment, the system main relay SMR-P and the resistive element R11 are connected in parallel with the system main relay SMR-B; however, connection of the system main relay SMR-P and the resistive element R11 is not limited to this configuration. The system main relay SMR-P and the resistive element R11 just need to be connected in parallel with one of the system main relays SMR-B, SMR-G.

The battery pack 10 may be, for example, mounted on a vehicle. Here, a motor generator may be used as the load 20. The motor generator generates kinetic energy for causing the vehicle to travel upon reception of electric power from the battery pack 10. The kinetic energy is transmitted to wheels. During braking of the vehicle, the motor generator generates electric power. The generated electric power is supplied to the battery pack 10.

Next, a circuit (drive circuit) that drives the system main relays SMR-B, SMR-P, SMR-G will be described with reference to FIG. 2.

The drive circuit 30 for driving the system main relays SMR-B, SMR-P, SMR-G includes a coil 31 and switch elements SW1, SW2, SW3. One end of the coil 31 is grounded. The other end of the coil 31 is connected to a power supply 32. Thus, electric power from the power supply 32 is supplied to the coil 31. The battery pack 10 or a power supply different from the battery pack 10 may be used as the power supply 32. When the battery pack 10 is mounted on the vehicle, there is a known auxiliary battery as a power supply different from the battery pack 10.

A line that supplies electric power of the power supply 32 to the coil 31 includes a first power line SL1, a second power line SL2 and a common power line SL3. One end of the first power line SL1 and one end of the second power line SL2 are connected to the coil 31 via the common power line SL3. The other end of the first power line SL1 and the other end of the second power line SL2 are connected to the power supply 32 via the common power line SL3. Therefore, electric power of the power supply 32 is allowed to be supplied to the coil 31 via the first power line SL1 or electric power of the power supply 32 is allowed to be supplied to the coil 31 via the second power line SL2.

The switch elements SW1, SW2 are provided in the first power line SL1. The switch elements SW1, SW2 are connected in series with each other. Specifically, one end of the switch element (which corresponds to a first switch element according to the invention) SW1 is connected to the power supply 32. The other end of the switch element SW1 is connected to one end of the switch element (which corresponds to a second switch element according to the invention) SW2. The other end of the switch element SW2 is connected to the coil 31. Upon reception of a control signal from a controller 40, each of the switch elements SW1, SW2 switches between an on state (energized state) and an off state (non-energized state).

The switch element (which corresponds to a third switch element according to the invention) SW3 and a resistive element (which corresponds to a second resistive element according to the invention) R21 are connected in parallel with the switch elements SW1, SW2 via the second power line SL2. The switch element SW3 and the resistive element R21 are connected in series with each other. Specifically, one end of the resistive element R21 is connected to a connection point at which the switch element SW1 and the power supply 32 are connected to each other. The other end of the resistive element R21 is connected to one end of the switch element SW3. The other end of the switch element SW3 is connected to a connection point at which the coil 31 and the switch element SW2 are connected to each other. The switch element SW3 may be provided at the location of the resistive element R21 shown in FIG. 2, and the resistive element R21 may be provided at the location of the switch element SW3 shown in FIG. 2.

A so-called mechanical switch or a semiconductor switch (for example, transistor) may be used as each of the switch elements SW1, SW2, SW3. Each mechanical switch has a movable contact and a fixed contact. When the movable contact contacts a corresponding one of the fixed contacts, a corresponding one of the switch elements (mechanical switches) SW1, SW2, SW3 enters the on state. When the movable contact moves away from a corresponding one of the fixed contacts, a corresponding one of the switch elements (mechanical switches) SW1, SW2, SW3 enters the off state. The semiconductor switch switches between the on state and the off state in response to the migration state of ions.

A voltage sensor (which corresponds to a first voltage sensor according to the invention) 33 is connected to a connection point at which the switch element SW1 and the switch element SW2 are connected to each other. The voltage sensor 33 detects a voltage value V1 between the connection point of the switch elements SW1, SW2 and a ground, and outputs a detected signal to a controller 40. A voltage sensor (which corresponds to a second voltage sensor according to the invention) 34 is connected to a connection point at which the switch element SW2 and the coil 31 are connected to each other. The voltage sensor 34 detects a voltage value V2 between the connection point of the switch element SW2 and coil 31 and the ground, and outputs a detected signal to the controller 40.

A voltage sensor (which corresponds to a third voltage sensor according to the invention) 35 is connected to a connection point at which the switch element SW3 and the coil 31 are connected to each other (in the second power line SL2). The voltage sensor 35 detects a voltage value V3 between the connection point of the switch element SW3 and coil 31 and the ground, and outputs a detected signal to the controller 40. As described above, when the locations of the switch element SW3 and resistive element R21 are interchanged, the voltage sensor 35 detects the voltage value V3 between the connection point of the resistive element R21 and coil 31 and the ground. That is, the voltage value V3 between the ground and part of the second power line SL2 just needs to be detected by the voltage sensor 35. The part of the second power line SL2 connects the serially connected switch element SW3 and resistive element R21 to the coil 31.

When the switch elements SW1, SW2 are in the on state, electric power is supplied from the power supply 32 to the coil 31 via the power lines SL1, SL3. When the switch elements SW1, SW2 are in the off state but when the switch element SW3 is in the on state, electric power is supplied from the power supply 32 to the coil 31 via the power lines SL2, SL3. Because the resistive element R21 is provided in the second power line SL2, a current value (which corresponds to a first current value according to the invention) I2 flowing to the coil 31 via the second power line SL2 is smaller than a current value (which corresponds to a second current value according to the invention) flowing to the coil 31 via the first power line SL1.

In this way, by switching between a state where the switch elements SW1, SW2 are in the on state and a state where the switch element SW3 is in the on state, it is possible to switch the current value flowing to the coil 31 between the current value I1 and the current value I2. When the switch elements SW1, SW2, SW3 are in the off state, when the switch elements SW1, SW3 are in the off state, or when the switch elements SW2, SW3 are in the off state, no current flows from the power supply 32 to the coil 31.

Figure 4:
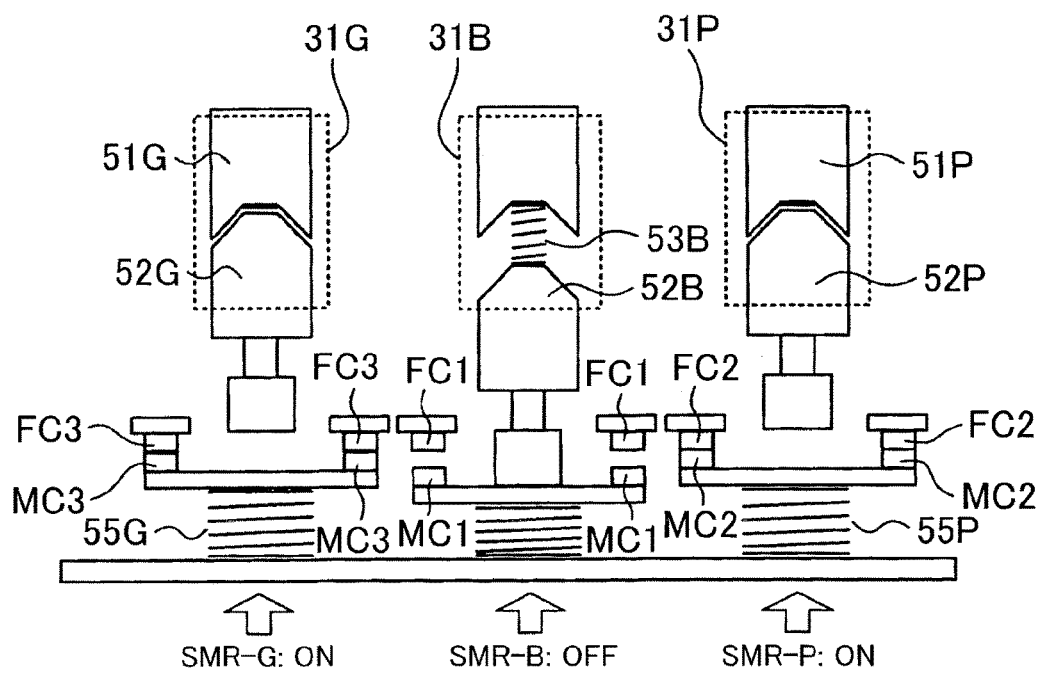
FIG. 4 is a schematic view that shows the structure that drives the system main relays.
Figure 5:
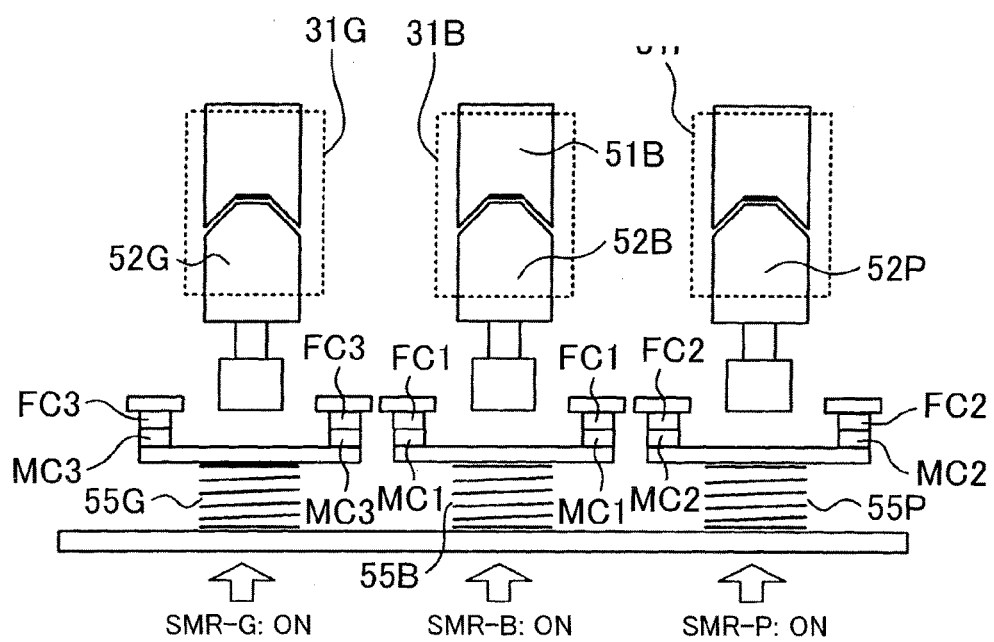
FIG. 5 is a schematic view that shows the structure that drives the system main relays.

Next, a structure for driving the system main relays SMR-B, SMR-P, SMR-G will be described with reference to FIG. 3 to FIG. 5.

Figure 2:
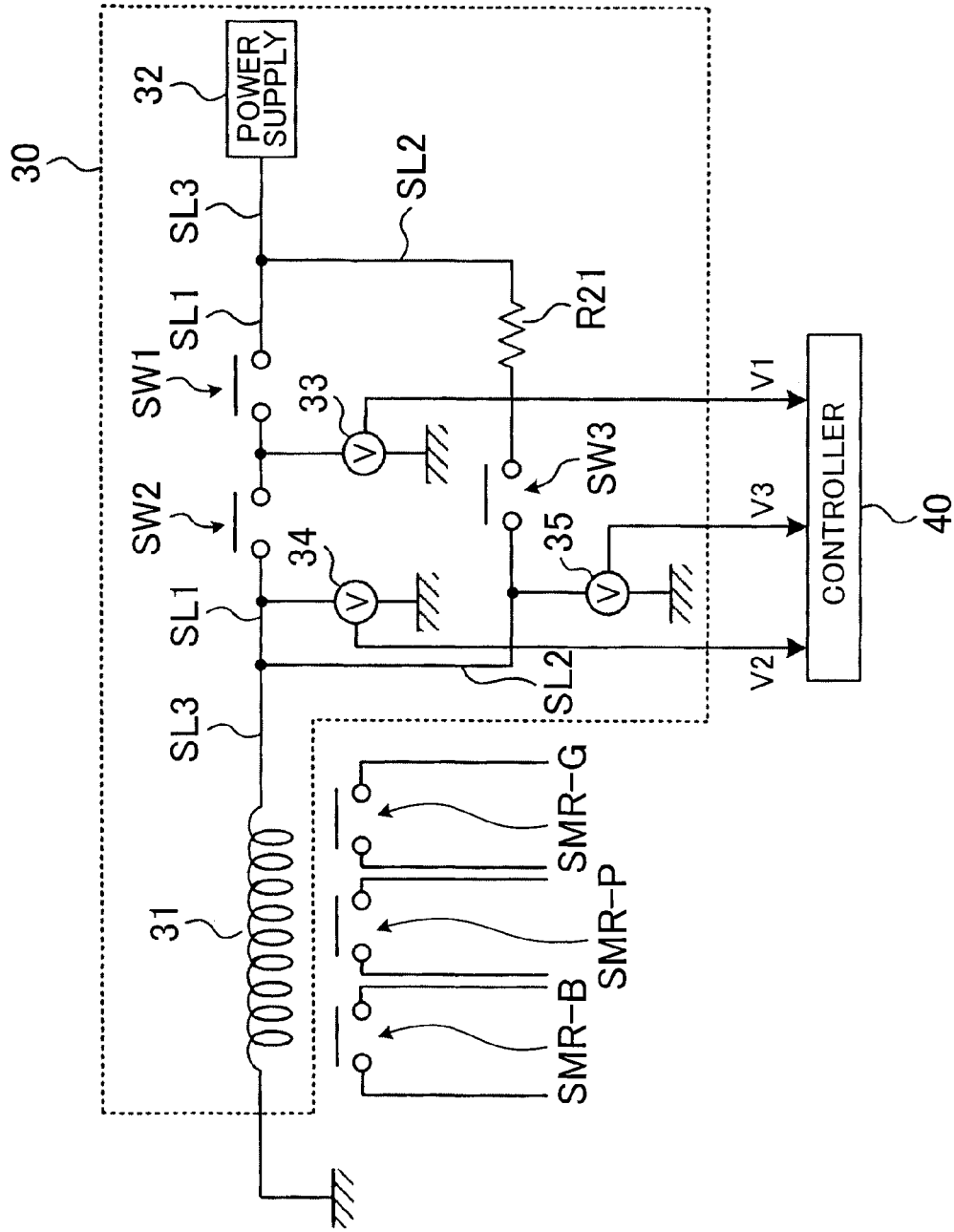
FIG. 2 is a view that shows the configuration of a circuit that drives system main relays according to a first embodiment.
Figure 3:
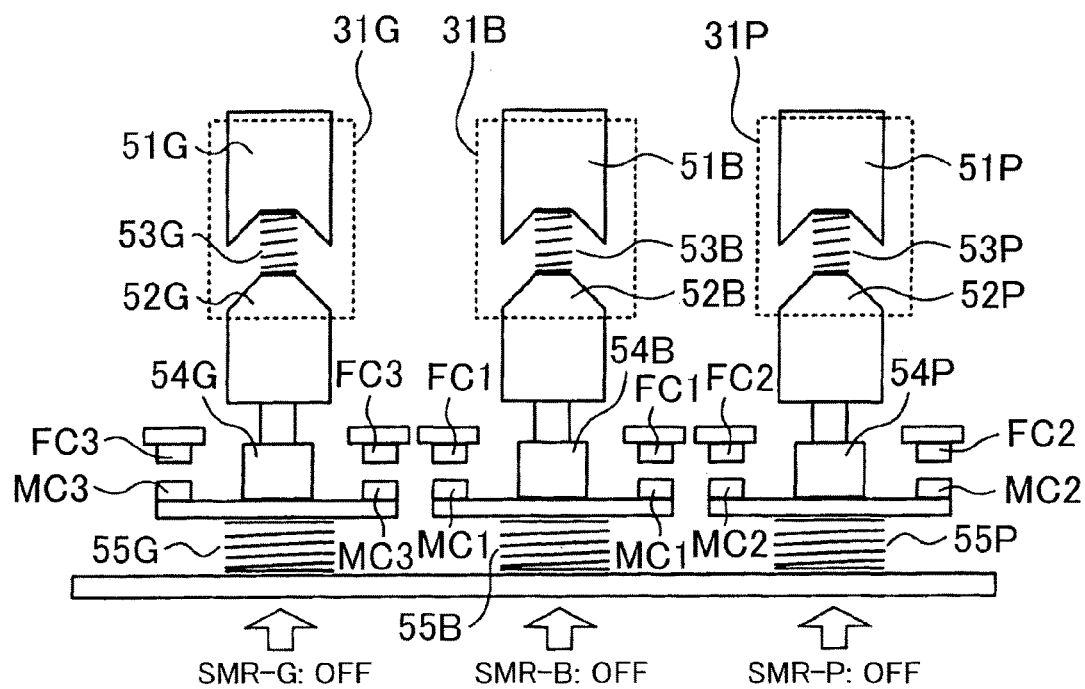
FIG. 3 is a schematic view that shows a structure that drives the system main relays.

In the state shown in FIG. 3, all the system main relays SMR-B, SMR-P, SMR-G are in the off state, and the switch elements SW1, SW2, SW3 shown in FIG. 2 are in the off state. Three coils 31G, 31B, 31P shown in FIG. 3 are connected to one another, and constitute the coil 31 shown in FIG. 2. That is, when current is flowing through at least one of the coils 31G, 31B, 31P, current is also flowing through the other coils.

A spring 53G is connected to a fixed core 51G and a movable core 52G. The spring 53G urges the movable core 52G in a direction to move away from the fixed core 51G. A pressing member 54G is provided at the distal end of the movable core 52G. The pressing member 54G contacts the movable contact MC3. The spring 55G urges the movable contact MC3 in a direction to approach the fixed contact FC3.

The fixed cores 51B, 51P have a similar function to that of the fixed core 51G. The movable cores 52B, 52P have a similar function to that of the movable core 52G. The springs 53B, 53P have a similar function to that of the spring 53G. The pressing members 54B, 54P have a similar function to that of the pressing member 54G. The springs 55B, 55P have a similar function to that of the spring 55G.

When no current is flowing through the coil 31G, the movable core 52G that has received the urging force of the spring 53G moves in the direction away from the fixed core 51G, and the pressing member 54G moves the movable contact MC3 in the direction away from the fixed contact FC3. Thus, the system main relay SMR-G is in the off state. Similarly, when no current is flowing through the coils 31B, 31P, the system main relays SMR-B, SMR-P are in the off state.

When current is caused to flow from the power supply 32 to the coil 31 via the second power line SL2, the movable core 52G moves in the direction to approach the fixed core 51G against the urging force of the spring 53G, and the movable core 52P moves in the direction to approach the fixed core 51P against the urging force of the spring 53P. The movable core 52G is moved by electromagnetic force generated by energization of the coil 31G, and the movable core 52P is moved by electromagnetic force generated by energization of the coil 31P, as shown in FIG. 4. As a result of movement of the movable core 52G, the movable contact MC3 receives the urging force of the spring 55G, and contacts the fixed contact FC3. As a result of movement of the movable core 52P, the movable contact MC2 receives the urging force of the spring 55P, and contacts the fixed contact FC2. Thus, the system main relays SMR-G, SMR-P switch from the off state to the on state.

Current is also flowing through the coil 31B. Even by electromagnetic force generated by energization of the coil 31B, the movable core 52B does not move against the urging force of the spring 53B. For example, by setting the urging force of the spring 53B such that the urging force of the spring 53B is larger than the urging force of each of the springs 53G, 53P, it is possible to cause the movable core 52B not to move against the urging force of the spring 53B. Thus, only the movable core 52B is kept in the state shown in FIG. 3, and the system main relay SMR-B remains in the off state.

On the other hand, when the switch element SW3 is set to the off state and the switch elements SW1, SW2 are set to the on state, current flows from the power supply 32 to the coil 31 via the first power line SL1. As described above, the current value I1 is larger than the current value I2. Therefore, by electromagnetic force generated by energization of the coil 31B, the movable core 52B moves in the direction to approach the fixed core 51B against the urging force of the spring 53B. As a result of the movement of the movable core 52B, the movable contact MC1 receives the urging force of the spring 55B, and contacts the fixed contact FC1. Thus, as shown in FIG. 5, the system main relay SMR-B enters the on state.

During energization of the coil 31B, current is also flowing through the coils 31G, 31P. The current value I1 flowing through the coils 31B, 31G, 31P in the state shown in FIG. 5 is larger than the current value I2 flowing through the coils 31G, 31P in the state shown in FIG. 4. Therefore, the system main relays SMR-G, SMR-P are in the on state even in the state shown in FIG. 5.

According to the present embodiment, it is possible to cause the three system main relays SMR-B, SMR-G, SMR-P to operate by energization of the single coil 31. By switching the current value flowing through the coil 31, it is possible to switch between the state where only the system main relays SMR-G, SMR-P are set to the on state (the state shown in FIG. 4) and the state where all the system main relays SMR-B, SMR-G, SMR-P are set to the on state (the state shown in FIG. 5).

Thus, in the battery system shown in FIG. 1, initially, the system main relays SMR-G, SMR-P are set to the on state by causing current having the current value I2 to flow through the coil 31. With this configuration, it is possible to cause the discharge current of the battery pack 10 to flow to the capacitor C via the resistive element R11. Thus, when the capacitor C is charged, it is possible to inhibit flow of inrush current from the battery pack 10 to the capacitor C. After the charging of the capacitor C has completed, it is possible to switch the system main relay SMR-B from the off state to the on state by causing current having the current value I1 to flow through the coil 31.

When the system main relay SMR-B has switched from the off state to the on state, connection of the battery pack 10 with the load 20 completes, and the battery system shown in FIG. 1 enters an activated state (ready-on state). When connection of the battery pack 10 with the load 20 is interrupted and the battery system shown in FIG. 1 is caused to enter a stopped state (ready-off state), energization of the coil 31 just needs to be interrupted by setting the switch elements SW1, SW2, SW3 shown in FIG. 2 to the off state.

In the present embodiment, the movable contacts MC2, MC3 may be caused to integrally operate by mechanically connecting the movable contacts MC2, MC3 to each other. In this case, it is possible to cause the movable contacts MC2, MC3 to operate by using only one of the movable cores 52G, 52P. For example, when the movable core 52G is used, the fixed core 51P, the movable core 52P, the coil 31P, and the like, may be omitted, so it is possible to reduce the number of components. Because no electric power is consumed in the coil 31P, it is possible to reduce electric power that is consumed in the coil 31 as compared to the case where the coils 31G, 31B, 31P are used.

If the drive circuit 30 has a failure, there is a concern that current continues flowing through the coil 31. If current continues flowing through the coil 31, the system main relays SMR-B, SMR-G, SMR-P remain in the on state, with the result that the battery pack 10 remains connected to the load 20. If the battery pack 10 remains connected to the load 20, there is a concern that, for example, electric power from the load 20 continues being supplied to the battery pack 10 and, as a result, the battery pack 10 enters an overcharged state.

In the present embodiment, the two switch elements SW1, SW2 are provided in the first power line SL1. If only one of the switch elements SW1, SW2 is provided, current can continue flowing through the coil 31 because of a failure of the provided switch element. A failure (hereinafter, referred to as on-failure) of the switch element means a state where the switch element remains in the on state although control for setting the switch element to the off state is executed.

As in the case of the present embodiment, by providing the two switch elements SW1, SW2, even when one of the switch elements has an on-failure, it is possible to set the other one of the switch elements to the off state. Thus, it is possible to prevent current from continuing flowing through the coil 31 via the first power line SL1, and it is possible to interrupt connection of the battery pack 10 with the load 20. In the present embodiment, the two switch elements SW1, SW2 are provided. However, the number of the switch elements just needs to be two or more. When the two or more switch elements are connected in series with each other in the first power line SL1, it is possible to set the remaining switch elements to the off state even when part of the switch elements has an on-failure.

On the other hand, when the switch element SW3 has an on-failure, the system main relays SMR-G, SMR-P remain in the on state as described above. The resistive element R11 is included in a current path that connects the battery pack 10 to the load 20. Therefore, when the battery pack 10 is charged with electric power from the load 20, it is possible to reduce the current value during charging. Thus, it is possible to extend a time until the battery pack 10 reaches the overcharged state.

In the present embodiment, it is determined whether the drive circuit 30 has a failure, and the process of determining whether the drive circuit 30 has a failure will be described with reference to the flowcharts shown in FIG. 6 and FIG. 7. The processes shown in FIG. 6 and FIG. 7 are executed by the controller 40.

Figure 6:
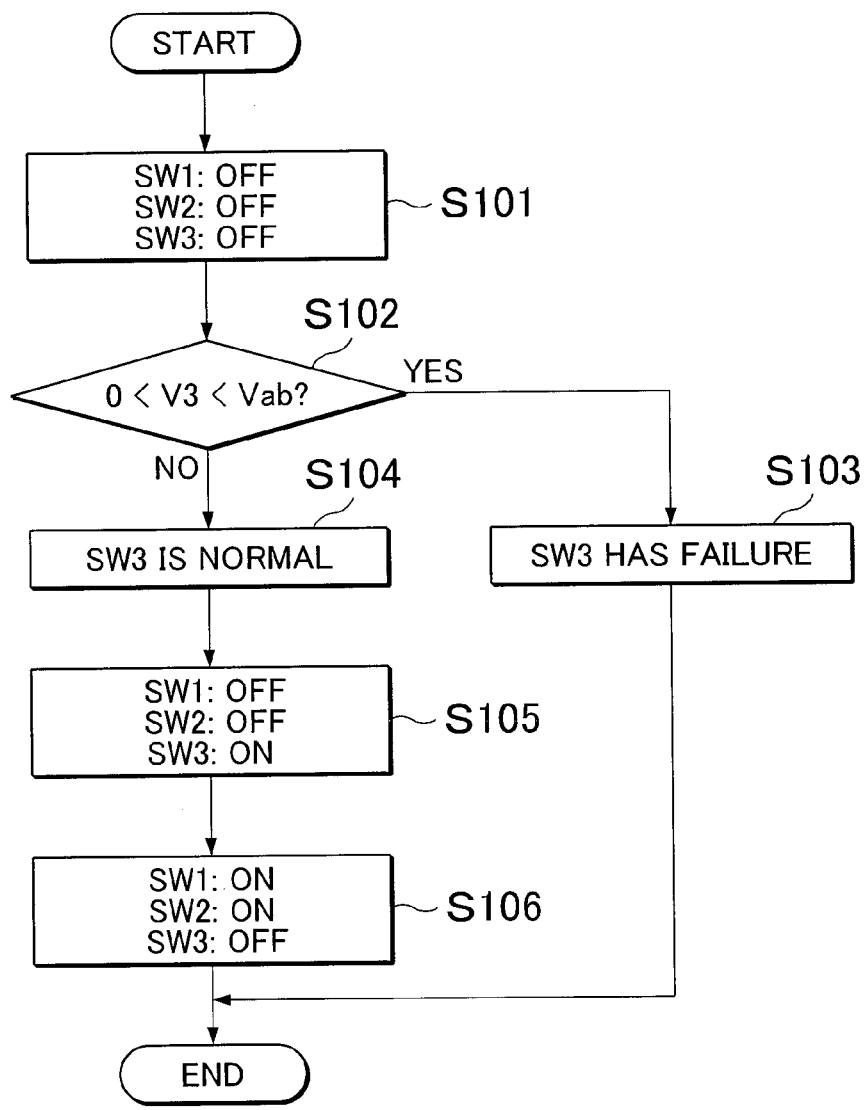
FIG. 6 is a flowchart that shows the process of determining whether the drive circuit has a failure according to the first embodiment.
Figure 7:
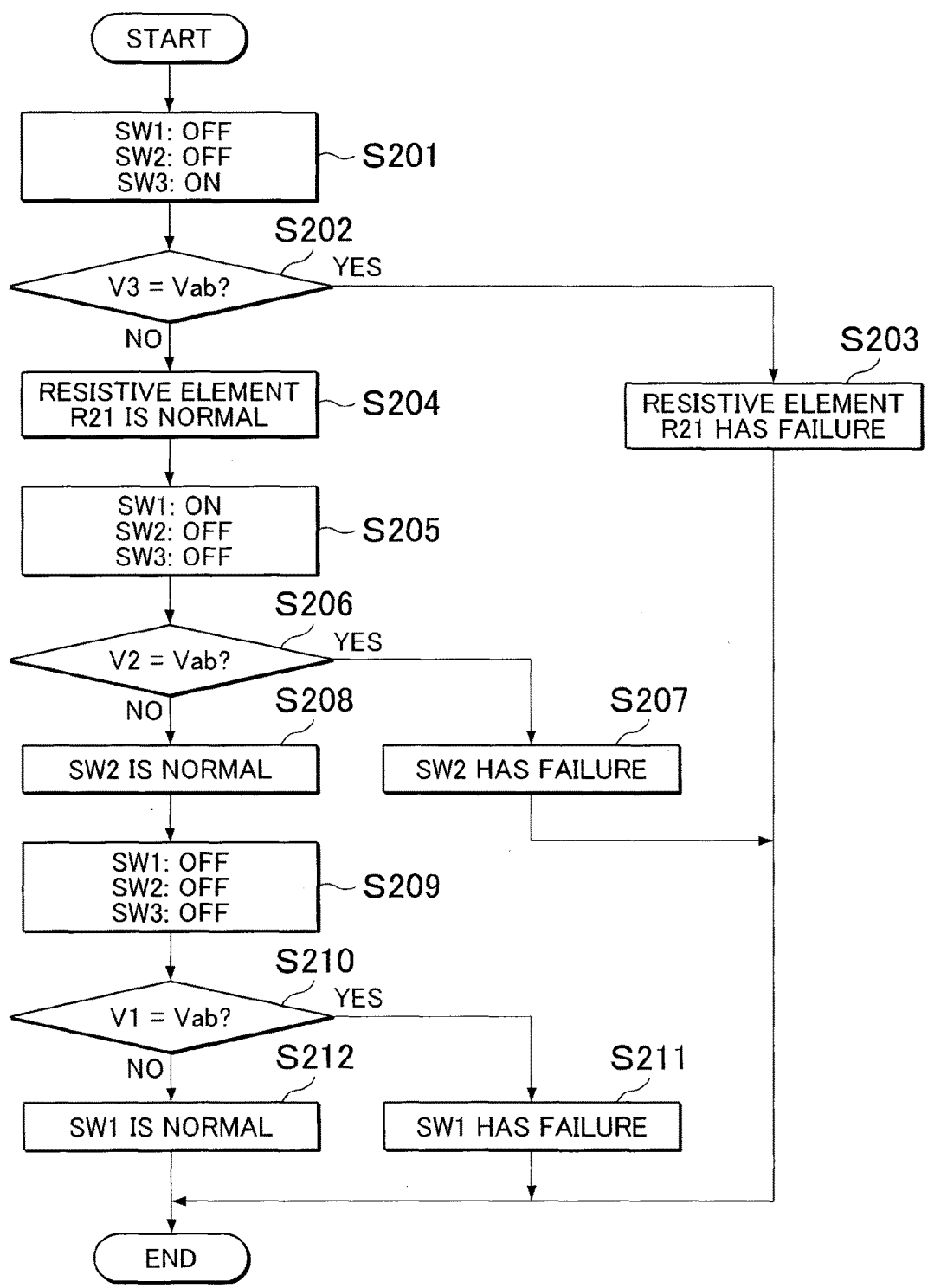
FIG. 7 is a flowchart that shows the process of determining whether the drive circuit has a failure according to the first embodiment.

The process shown in FIG. 6 is executed when the battery pack 10 and the load 20 are connected to each other. When the process shown in FIG. 6 is started, the system main relays SMR-B, SMR-P, SMR-G are in the off state.

In step S101, the controller 40 outputs control signals for setting the switch elements SW1, SW2, SW3 to the off state. When the process shown in FIG. 6 is started, connection of the battery pack 10 with the load 20 is interrupted. At this time, generally, the switch elements SW1, SW2, SW3 are in the off state. Therefore, the process of step S101 may be omitted.

In step S102, the controller 40 determines whether the voltage value V3 detected by the voltage sensor 35 is higher than substantially 0 [V] and is lower than a voltage value Vab. Substantially 0 [V] means that the voltage value that is detected by the voltage sensor 35 at the time when the switch element SW3 is in the off state includes a detection error of the voltage sensor 35. The voltage value Vab is the voltage value of the power supply 32. The voltage value Vab just needs to be detected before the process of step S102 is executed. When the voltage value V3 is higher than substantially 0 [V] and lower than the voltage value Vab, the controller 40 determines in step S103 that the switch element SW3 has an on-failure.

When the switch elements SW1, SW2 are in the off state and the switch element SW3 is in the on state, current flows from the power supply 32 to the coil 31 via the second power line SL2. Because the resistive element R21 is provided in the second power line SL2, the voltage value V3 is lower than the voltage value Vab by the amount of voltage drop due to the resistance value of the resistive element R21. That is, the voltage value V3 is higher than substantially 0 [V] and lower than the voltage value Vab. When this condition is satisfied, it may be determined that the switch element SW3 has an on-failure.

When the switch element SW3 is in the off state, the voltage value V3 is substantially 0 [V]. Therefore, the controller 40 determines in step S104 that the switch element SW3 is normal. After it is determined that the switch element SW3 is normal, the controller 40 outputs a control signal for setting the switch element SW3 to the on state in step S105. The switch element SW3 switches from the off state to the on state upon reception of the control signal from the controller 40. Current flows from the power supply 32 to the coil 31 via the second power line SL2. Thus, the system main relays SMR-P, SMR-G switch from the off state to the on state, and the capacitor C is charged.

In step S106, the controller 40 outputs the control signals for setting the switch elements SW1, SW2 to the on state, and then outputs the control signal for setting the switch element SW3 to the off state. The process of step S106 is executed after the charging of the capacitor C has completed. For example, a time until the charging of the capacitor C completes is obtained in advance, and the process of step S106 may be executed after it is determined that the time has elapsed.

The switch elements SW1, SW2 switch from the off state to the on state upon reception of the control signals from the controller 40, and the switch element SW3 switches from the on state to the off state upon reception of the control signal from the controller 40. Thus, current flows from the power supply 32 to the coil 31 via the first power line SL1, and not only the system main relays SMR-P, SMR-G but also the system main relay SMR-B switches from the off state to the on state. When the process of step S106 has completed, the battery system shown in FIG. 1 enters the activated state.

The process shown in FIG. 7 is executed when connection of the battery pack 10 with the load 20 is interrupted. When the process shown in FIG. 7 is started, the switch elements SW1, SW2 are in the on state, and the switch element SW3 is in the off state. The system main relays SMR-B, SMR-P, SMR-G are in the on state.

In step S201, the controller 40 outputs a control signal for setting the switch element SW3 to the on state, and then outputs control signals for setting the switch elements SW1, SW2 to the off state. The switch element SW3 switches from the off state to the on state upon reception of the control signal from the controller 40, and the switch elements SW1, SW2 switch from the on state to the off state upon reception of the control signals from the controller 40. Thus, the current value flowing through the coil 31 decreases, so only the system main relay SMR-B switches from the on state to the off state.

In step S202, the controller 40 determines whether the voltage value V3 detected by the voltage sensor 35 is equal to the voltage value Vab. The voltage value Vab is detected by the voltage sensor; however, the voltage values V3, Vab can have variations due to a detection error of the voltage sensor, or the like. It may be determined whether the voltage value V3 is equal to Vab in consideration of the variations. Specifically, it is possible to determine whether the condition shown in the following mathematical expression (1) is satisfied.

$$Vab-\alpha \leq V3 \leq Vab+\alpha \quad (1)$$

The constant α shown in the mathematical expression (1) may be set as needed in consideration of variations of the voltage values V3, Vab. However, the constant α is smaller than the voltage drop due to the resistance value of the resistive element R21. When the condition expressed by the mathematical expression (1) is satisfied, it may be determined that the voltage value V3 is equal to Vab. When the condition expressed by the mathematical expression (1) is not satisfied, it may be determined that the voltage value V3 is different from Vab.

When the voltage value V3 is equal to Vab, the controller 40 determines in step S203 whether the resistive element R21 has a failure in a short-circuit state (decreased resistance state). A failure of the resistive element R21 means a failure in a short-circuit state. When the resistive element R21 has no failure, the voltage value V3 is lower than the voltage value Vab by the amount of voltage drop due to the resistance value of the resistive element R21. When the voltage value V3 is equal to Vab, there is no voltage drop due to the resistance value of the resistive element R21, so it may be determined that the resistive element R21 has a failure.

When the voltage value V3 is different from Vab, the controller 40 determines in step S204 that the resistive element R21 is normal. The "normal" means that the resistive element R21 has no failure. As described above, when the resistive element R21 has no failure, the voltage value V3 is lower than the voltage value Vab, and the voltage value V3 is different from Vab, so it may be determined that the resistive element R21 is normal.

In the present embodiment, when the resistive element R21 has a failure, the current value flowing through the coil 31 cannot be changed between the current values I1, I2. That is, because of a failure of the resistive element R21, only current having the current value I1 flows through the coil 31, with the result that all the system main relays SMR-B, SMR-P, SMR-G are operated at the same time. Therefore, as described above, in order to cause both the system main relays SMR-P, SMR-G and the system main relay SMR-B to operate at different timings, it is required to determine whether the resistive element R21 has a failure.

In step S205, the controller 40 outputs a control signal for setting the switch element SW1 to the on state, and outputs a control signal for setting the switch element SW3 to the off state. The switch element SW1 switches from the off state to the on state upon reception of the control signal from the controller 40, and the switch element SW3 switches from the on state to the off state upon reception of the control signal from the controller 40.

In step S206, the controller 40 determines whether the voltage value V2 detected by the voltage sensor 34 is equal to the voltage value Vab. In consideration of variations of the voltage values V2, Vab, when the condition expressed by the following mathematical expression (2) is satisfied, it may be determined that the voltage value V2 is equal to Vab.

$$Vab-\beta \leq V2 \leq Vab+\beta \quad (2)$$

The constant β shown in the mathematical expression (2) may be set as needed in consideration of variations of the voltage values V2, Vab. When the condition expressed by the mathematical expression (2) is not satisfied, it may be determined that the voltage value V2 is different from Vab.

When the voltage value V2 is equal to Vab, the controller 40 determines in step S207 that the switch element SW2 has an on-failure. When the process of step S206 is executed, only the switch element SW1 is controlled to the on state. When the switch element SW2 is in the on state, the voltage value V2 is equal to Vab. Therefore, by determining that the voltage value V2 is equal to Vab, it may be determined that the switch element SW2 has an on-failure.

On the other hand, when the voltage value V2 is different from Vab, the controller 40 determines in step S208 that the switch element SW2 is normal. The switch element SW2 enters the off state when the switch element SW2 is normal, and the voltage value V2 indicates substantially 0 [V]. That is, because the voltage value V2 is different from Vab, it may be determined in the process of step S208 that the switch element SW2 is normal.

In step S209, the controller 40 outputs a control signal for setting the switch element SW1 to the off state. The switch elements SW2, SW3 remain in the off state. In step S210, the controller 40 determines whether the voltage value V1 detected by the voltage sensor 33 is equal to the voltage value Vab. In consideration of variations of the voltage values V1, Vab, when the condition expressed by the following mathematical expression (3) is satisfied, it may be determined that the voltage value V1 is equal to Vab.

$$Vab-\gamma \leq V1 \leq Vab+\gamma \quad (3)$$

The constant γ shown in the mathematical expression (3) may be set as needed in consideration of variations of the voltage values V1, Vab. When the condition expressed by the mathematical expression (3) is not satisfied, it may be determined that the voltage value V1 is different from Vab.

When the voltage value V1 is equal to Vab, the controller 40 determines in step S211 that the switch element SW1 has an on-failure. When the voltage value V1 is equal to Vab although the switch element SW1 is controlled to the off state, it may be determined that the switch element SW1 has an on-failure.

On the other hand, when the voltage value V1 is different from Vab, the controller 40 determines in step S212 that the switch element SW1 is normal. The switch element SW1 enters the off state when the switch element SW1 is normal, and the voltage value V1 indicates substantially 0 [V], so the voltage value V1 is different from Vab. By determining that the voltage value V1 is different from Vab, it may be determined that the switch element SW1 is normal. When the process of step S212 has completed, the battery system shown in FIG. 1 enters the stopped state.

In the process shown in FIG. 6 and FIG. 7, when it is determined that any one of the switch elements SW1, SW2, SW3 or the resistive element R21 has a failure, a user, or the like, may be warned. Known means may be employed as needed as the warning to the user, or the like.

For example, a sound and an indication may be used as means for warning. Specifically, by generating a sound, it is possible to cause the user, or the like, to recognize that at least one of the switch elements SW1, SW2, SW3 or the resistive element R21 has a failure. By showing predetermined information on a display, it is possible to cause the user, or the like, to recognize that at least one of the switch elements SW1, SW2, SW3 or the resistive element R21 has a failure. Here, the user, or the like, does not need to recognize specific details of a failure, and the user, or the like, just needs to recognize that a failure is occurring.

On the other hand, when the switch elements SW1, SW2 have an on-failure, the system main relays SMR-B, SMR-G, SMR-P remain in the on state. When the switch element SW3 has an on-failure, the system main relays SMR-G, SMR-P remain in the on state. In this case, in addition to the above-described warming, for example, it is possible to execute the process of inhibiting an overcharged state of the battery pack 10 by limiting the input of the battery pack 10. This process may be executed by the controller 40.

According to the present embodiment, it is possible to determine whether any one of the switch elements SW1, SW2, SW3 or the resistive element R21 has a failure in the process at the time of activating the battery system (the process shown in FIG. 6) and the process at the time of stopping the battery system (the process shown in FIG. 7).

In executing the process shown in FIG. 6, when the switch elements SW1, SW2, SW3 and the resistive element R21 are normal, the system main relays SMR-B, SMR-P, SMR-G just switch from the off state to the on state. That is, with the process shown in FIG. 6, it is possible to determine that the switch element SW3 is normal without switching the system main relays SMR-B, SMR-P, SMR-G between the on state and the off state multiple times.

In executing the process shown in FIG. 7, when the switch elements SW1, SW2, SW3 and the resistive element R21 are normal, the system main relays SMR-B, SMR-P, SMR-G just switch from the on state to the off state. That is, with the process shown in FIG. 7, it is possible to determine that the switch elements SW1, SW2 and the resistive element R21 are normal without switching the system main relays SMR-B, SMR-P, SMR-G between the on state and the off state multiple times.

In this way, with the processes shown in FIG. 6 and FIG. 7, when it is determined that the switch elements SW1, SW2, SW3 and the resistive element R21 are normal, it is possible to prevent unnecessary operation of the system main relays SMR-B, SMR-P, SMR-G. That is, it is possible to prevent an increase in the number of times the system main relays SMR-B, SMR-P, SMR-G switch between the on state and the off state more than necessary, so it is possible to suppress advance of abrasion of each of the system main relays SMR-B, SMR-P, SMR-G.

The system main relay SMR-B includes the movable contact MC1 and the fixed contact FC1, the system main relay SMR-P includes the movable contact MC2 and the fixed contact FC2 and the system main relay SMR-G includes the movable contact MC3 and the fixed contact FC3. Therefore, as the number of times the system main relays SMR-B, SMR-G, SMR-P switch between the on state and the off state increases, the movable contacts MC1 to MC3 and the fixed contacts FC1 to FC3 tend to abrade. As described above, by preventing an increase in the number of times the system main relays SMR-B, SMR-G, SMR-P switch between the on state and the off state more than necessary, it is possible to suppress advance of abrasion of each of the movable contacts MC1 to MC3 and the fixed contacts FC1 to FC3.

A second embodiment of the invention will be described. In the present embodiment, like reference numerals denote the same components as those described in the first embodiment, and the detailed description is omitted. Hereinafter, the difference from the first embodiment will be mainly described.

Figure 8:
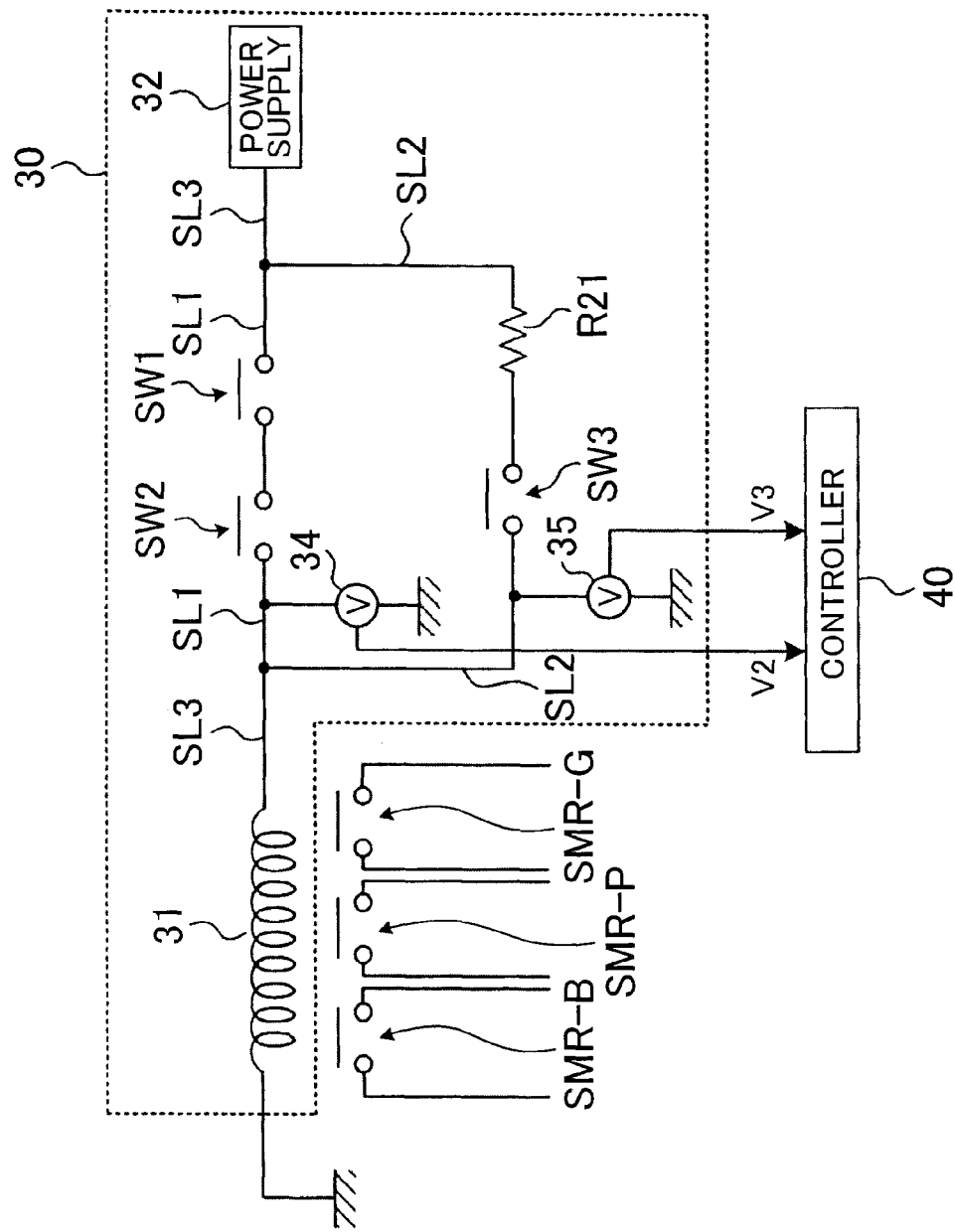
FIG. 8 is a view that shows the configuration of a circuit that drives system main relays according to a second embodiment.

FIG. 8 shows the configuration of the drive circuit 30 according to the present embodiment. The voltage sensor 33 is provided in the first embodiment, whereas the voltage sensor 33 is omitted in the present embodiment. Except this point, the drive circuit 30 according to the present embodiment is the same as the drive circuit 30 according to the first embodiment. According to the present embodiment, as compared to the first embodiment, the voltage sensor 33 is omitted, so it is possible to reduce the number of components.

Figure 9:
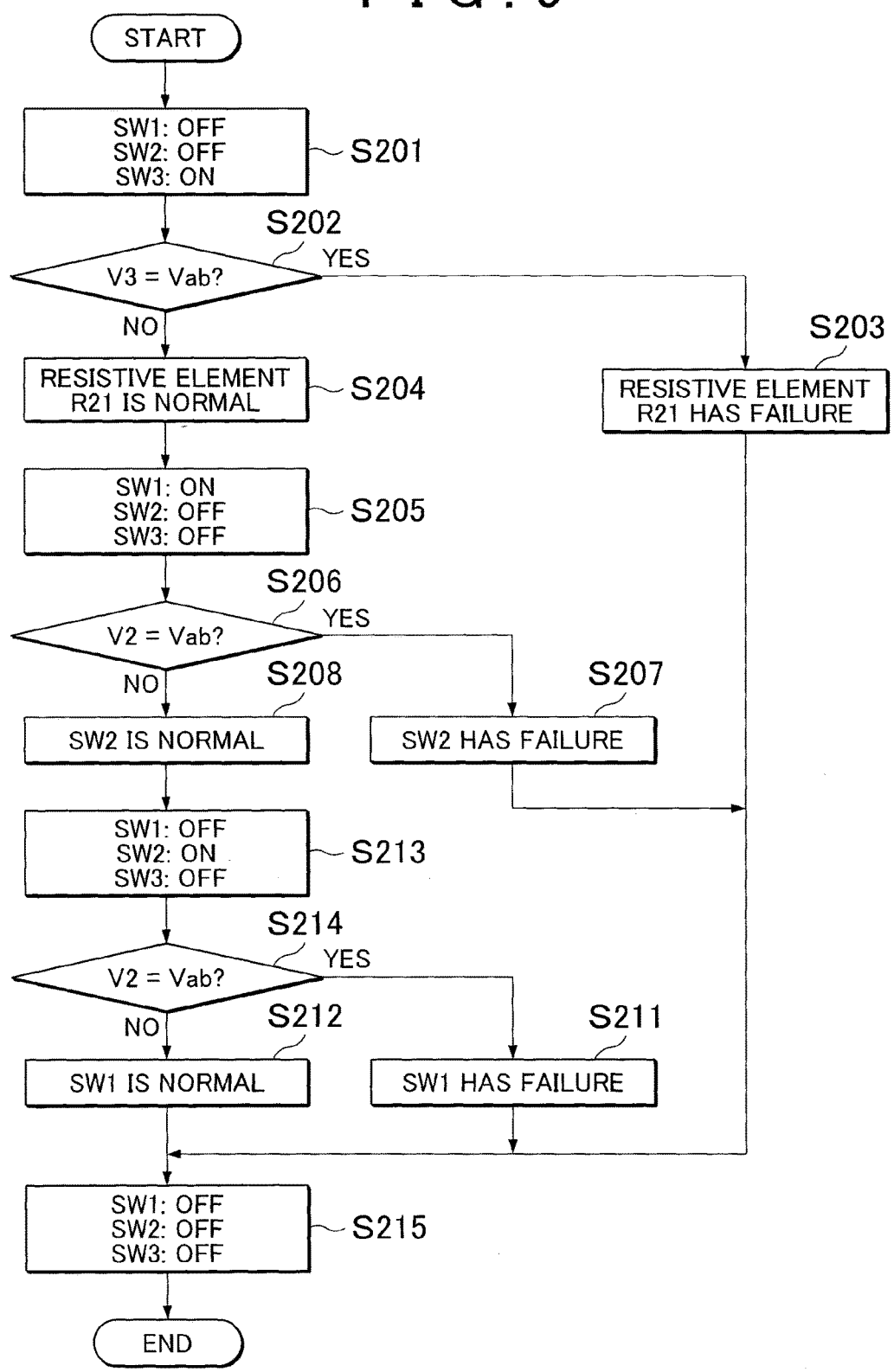
FIG. 9 is a flowchart that shows the process of determining whether the drive circuit has a failure according to the second embodiment.

FIG. 9 is a flowchart that shows the process of determining whether the drive circuit 30 has a failure. The process shown in FIG. 9 corresponds to the process shown in FIG. 7. Like step numbers denote the same processes as those described in FIG. 7, and the detailed description is omitted. In step S213 of FIG. 9, the controller 40 outputs a control signal for setting the switch element SW1 to the off state, and outputs a control signal for setting the switch element SW2 to the on state.

In step S214, the controller 40 determines whether the voltage value V2 detected by the voltage sensor 34 is equal to the voltage value Vab. When the voltage value V2 is equal to Vab, the controller 40 determines in step S211 that the switch element SW1 has an on-failure. On the other hand, when the voltage value V2 is different from Vab, the controller 40 determines in step S212 that the switch element SW1 is normal. In step S215, the controller 40 outputs a control signal for setting the switch element SW2 to the off state. When it is determined whether the switch element SW3 has an on-failure, the process shown in FIG. 6 just needs to be executed.

A third embodiment of the invention will be described. In the present embodiment, like reference numerals denote the same components as those described in the first embodiment, and the detailed description is omitted. Hereinafter, the difference from the first embodiment will be mainly described.

In the first embodiment, it is determined whether any one of the switch elements SW1, SW2, SW3 or the resistive element R21 has a failure on the basis of the detected results of the voltage sensors 33 to 35; however, a method of determining whether any one of the switch elements SW1, SW2, SW3 or the resistive element R21 has a failure is not limited to this configuration. Specifically, it may be determined by using a current sensor whether any one of the switch elements SW1, SW2, SW3 or the resistive element R21 has a failure.

Figure 10:
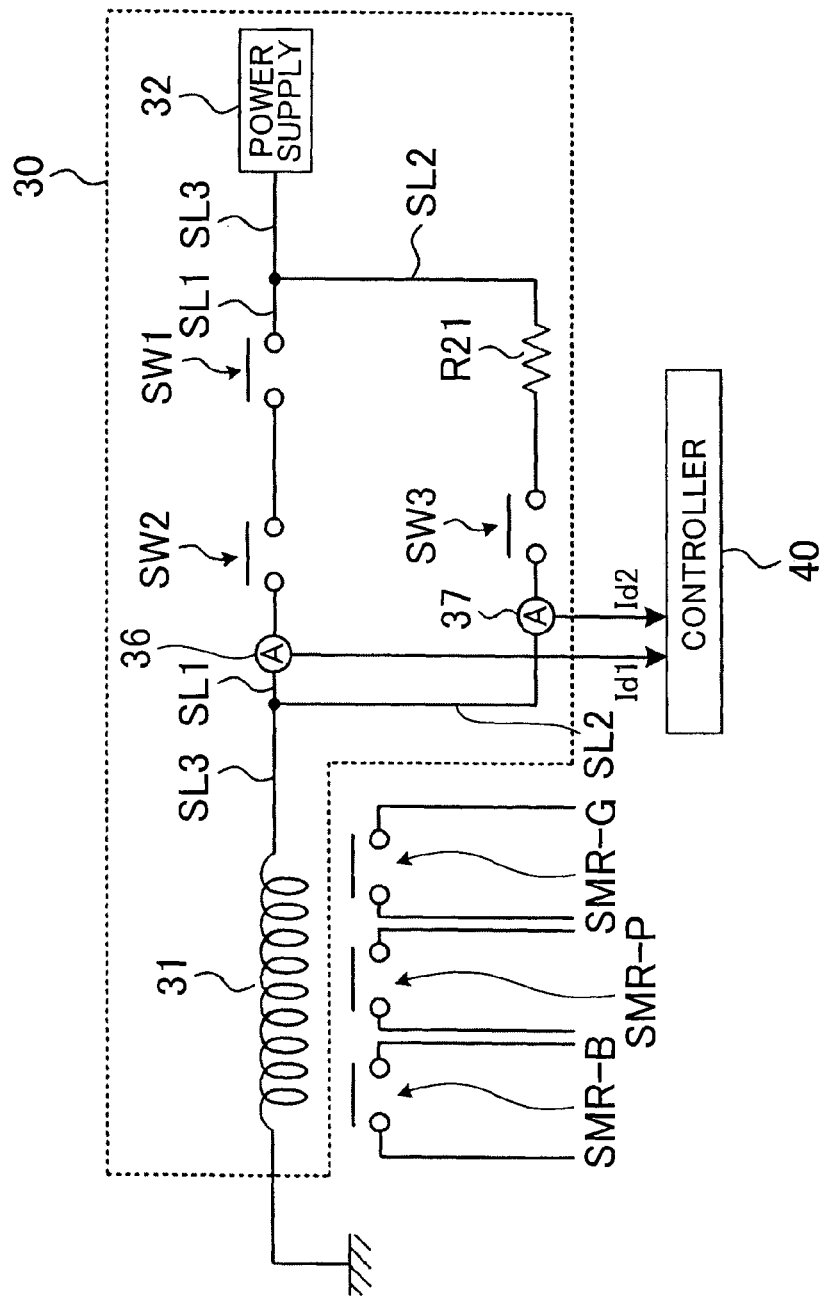
FIG. 10 is a view that shows the configuration of a circuit that drives system main relays according to a third embodiment.

FIG. 10 shows the configuration of the drive circuit 30 according to the present embodiment. A current sensor 36 is provided in the first power line SL1 between the switch element SW2 and the coil 31. The current sensor 36 detects a current value Id1 flowing from the switch element SW2 to the coil 31, and outputs a detected signal to the controller 40.

A current sensor 37 is provided in the second power line SL2 between the switch element SW3 and the coil 31. The current sensor 37 detects a current value Id2 flowing from the switch element SW3 to the coil 31, and outputs a detected signal to the controller 40.

Next, in the present embodiment, the process of determining whether the drive circuit 30 has a failure will be described with reference to FIG. 11 and FIG. 12. The process shown in FIG. 11 corresponds to the process shown in FIG. 6. The process shown in FIG. 12 corresponds to the process shown in FIG. 7.

Figure 11:
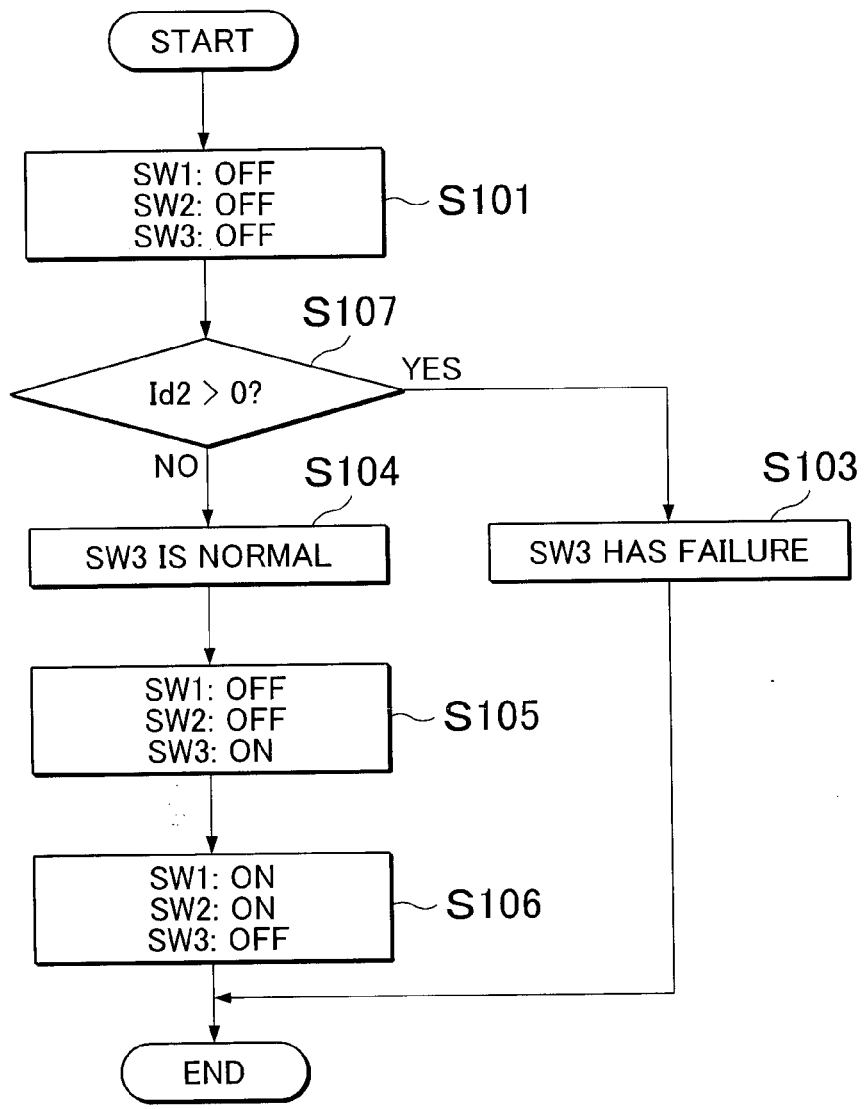
FIG. 11 is a flowchart that shows the process of determining whether the drive circuit has a failure according to the third embodiment.

In FIG. 11, like step numbers denote the same processes as those described in FIG. 6, and the detailed description is omitted. In FIG. 11, after the process of step S101 is executed, the process of step S107 is executed. In step S107, the controller 40 determines whether the current value Id2 detected by the current sensor 37 is larger than substantially 0 [A]. Substantially 0 [A] means that the current value Id2 that is detected by the current sensor 37 at the time when the switch element SW3 is in the off state includes a detection error of the current sensor 37.

When the current value Id2 is larger than substantially 0 [A], the controller 40 determines in step S103 that the switch element SW3 has an on-failure. When the switch element SW3 is in the on state, current flows from the power supply 32 to the coil 31 via the second power line SL2, so the current value Id2 is larger than substantially 0 [A]. Therefore, by determining that the current value Id2 is larger than substantially 0 [A], it is possible to determine that the switch element SW3 has an on-failure.

Figure 12:
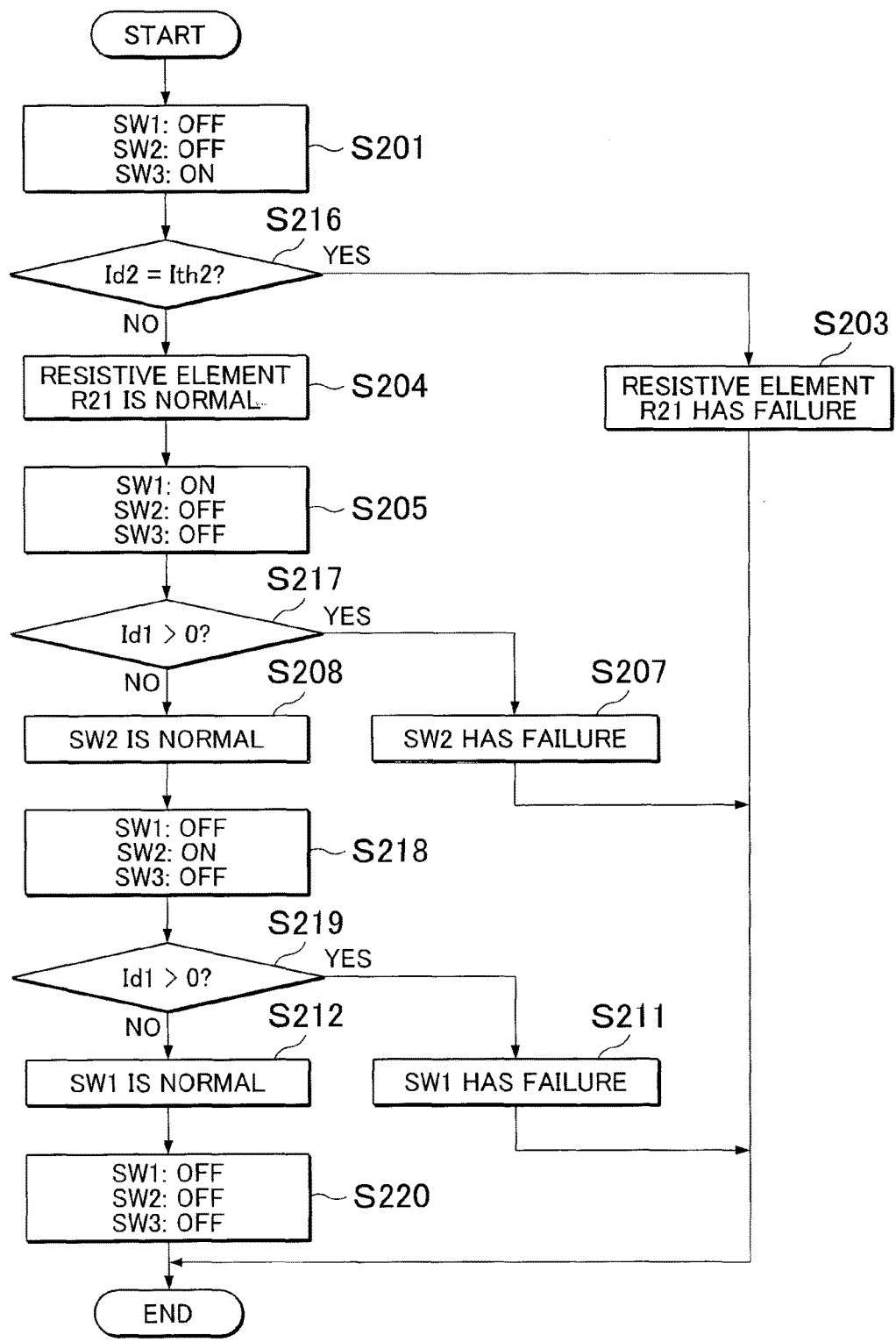
FIG. 12 is a flowchart that shows the process of determining whether the drive circuit has a failure according to the third embodiment.

In FIG. 12, like step numbers denote the same processes as those described in FIG. 7, and the detailed description is omitted. In FIG. 12, after the process of step S201 is executed, the process of step S216 is executed. In step S216, the controller 40 determines whether the current value Id2 detected by the current sensor 37 is equal to a current value Ith2. The current value Ith2 is equal to the current value I1 flowing through the first power line SL1. The current value Id1 detected by the current sensor 36 at the time when the process shown in FIG. 11 is executed may be used as the current value Ith2.

When the current value Id2 is equal to Ith2, the controller 40 determines in step S203 that the resistive element R21 has a failure. When the resistive element R21 has a failure, the current value flowing through the second power line SL2 is equal to the current value flowing through the first power line SL1. Therefore, by determining that the current value Id2 is equal to the current value Ith2 (Id1), it is possible to determine that the resistive element R21 has a failure. In consideration of variations of the current values Id2, Ith2, by setting similar conditions to the above-described mathematical expressions (1) to (3), it is possible to determine whether the current value Id2 is equal to Ith2.

When the current value Id2 is different from Ith2, the controller 40 determines in step S204 that the resistive element R21 is normal. When the resistive element R21 has no failure, the current value Id2 is smaller than the current value (that is, the current value Ith2) flowing through the first power line SL1 because of the resistance value of the resistive element R21. Therefore, by determining that the current value Id2 is different from Ith2, it is possible to determine that the resistive element R21 is normal.

After the process of step S205, the process of step S217 is executed. In step S217, the controller 40 determines whether the current value Id1 detected by the current sensor 36 is larger than substantially 0 [A]. Substantially 0 [A] means to include a detection error of the current sensor 36.

When the current value Id1 is larger than substantially 0 [A], the controller 40 determines in step S207 that the switch element SW2 has an on-failure. On the other hand, when the current value Id1 is substantially 0 [A], the controller 40 determines in step S208 that the switch element SW2 is normal.

When the process of step S217 is executed, only the switch element SW1 is controlled to the on state. When the switch element SW2 is in the on state, the current value Id1 is larger than substantially 0 [A]. Therefore, by determining that the current value Id1 is larger than substantially 0 [A], it is possible to determine that the switch element SW2 has an on-failure.

After the process of step S208 is executed, in step S218, the controller 40 outputs a control signal for setting the switch element SW1 to the off state, and outputs a control signal for setting the switch element SW2 to the on state. In step S219, the controller 40 determines whether the current value Id1 detected by the current sensor 36 is larger than substantially 0 [A].

Substantially 0 [A] means to include a detection error of the current sensor 36. When the current value Id1 is larger than substantially 0 [A], the controller 40 determines in step S211 that the switch element SW1 has an on-failure. On the other hand, when the current value Id1 is substantially 0 [A], the controller 40 determines in step S212 that the switch element SW1 is normal.

When the process of step S219 is executed, only the switch element SW2 is controlled to the on state. When the switch element SW1 is in the on state, the current value Id1 is larger than substantially 0 [A]. Therefore, by determining that the current value Id1 is larger than substantially 0 [A], it is possible to determine that the switch element SW1 has an on-failure.

In step S220, the controller 40 outputs a control signal for setting the switch element SW2 to the off state. The switch element SW2 switches from the on state to the off state upon reception of the control signal from the controller 40. When the process of step S220 has completed, the battery system enters the stopped state.

In the present embodiment, it is determined whether any one of the switch elements SW1 to SW3 has an on-failure or whether the resistive element R21 has a failure by using the current sensors 36, 37; however, a method of determining whether any one of the switch elements SW1 to SW3 has an on-failure or whether the resistive element R21 has a failure is not limited to this configuration. Specifically, in the present embodiment, instead of using the current sensor 36, the voltage sensors 33, 34 may be used as described in the first embodiment (FIG. 2) or the voltage sensor 34 may be used as described in the second embodiment (FIG. 8). Thus, as described in the first and second embodiments, it is possible to determine whether any one of the switch elements SW1, SW2 has an on-failure.

In the present embodiment, instead of using the current sensor 37, the voltage sensor 35 described in the first embodiment (FIG. 2) or the second embodiment (FIG. 8) may be used. Thus, as described in the first and second embodiments, it is possible to determine whether the switch element SW3 has an on-failure or whether the resistive element R21 has a failure.

The invention claimed is:
1. An electrical storage system comprising:
an electrical storage device;
a load;
a positive electrode line that connects the electrical storage device to the load;

a negative electrode line that connects the electrical storage device to the load;
a first relay provided in the positive electrode line;
a second relay provided in the negative electrode line;
a third relay connected in series with a first resistive element, the third relay and the first resistive element being connected in parallel with the first relay, the first resistive element being provided in the positive electrode line;
a drive circuit including a coil, a first power line, a second power line, and a sensor,
the coil being configured to generate electromagnetic force for switching the second relay and the third relay from a non-energized state to an energized state by energization at a first current value, the coil being configured to generate electromagnetic force for switching the first relay, the second relay and the third relay from a non-energized state to an energized state by energization at a second current value larger than the first current value, the energized state being on state, the non-energized state being off state,
the first power line including a first switch element and a second switch element connected in series with each other, the first power line being configured to supply current having the second current value from a power supply to the coil,
the second power line including a second resistive element and a third switch element connected in series with each other, the second power line being configured to supply current having the first current value from the power supply to the coil, and
the sensor being configured to change an output signal on the basis of whether each switch element is in the energized state or the non-energized state,
the drive circuit being configured to cause both the second and third relays and the first relay to operate at different timings; and
a controller configured to:
(a) control operation of the drive circuit,
(b) output a control signal for setting each switch element to the non-energized state, and
(c) determine whether any one of the switch elements has a failure in the energized state on the basis of the output signal of the sensor.

2. The electrical storage system according to claim 1, wherein
the first switch element is provided in the first power line between the power supply and the second switch element,
the sensor includes a first voltage sensor and a second voltage sensor, the first voltage sensor is configured to detect a voltage value between a ground and a connection point at which the first switch element and the second switch element are connected to each other, and the second voltage sensor is configured to detect a voltage value between the ground and a connection point at which the second switch element and the coil are connected to each other,
the controller is configured to output a control signal for setting the first switch element to the energized state and output a control signal for setting the second switch element to the non-energized state, the controller is configured to determine that the second switch element has a failure in the energized state when the voltage value detected by the second voltage sensor is equal to a voltage value of the power supply, and
the controller is configured to output a control signal for setting the first switch element and the second switch element to the non-energized state, the controller is configured to determine that the first switch element has a failure in the energized state when the voltage value detected by the first voltage sensor is equal to the voltage value of the power supply.

3. The electrical storage system according to claim 1, wherein
the first switch element is provided in the first power line between the power supply and the second switch element,
the sensor includes a voltage sensor configured to detect a voltage value between a ground and a connection point at which the second switch element and the coil are connected to each other,
the controller is configured to output a control signal for setting the first switch element to the non-energized state and a control signal for setting the second switch element to the energized state, and the controller is configured to determine that the first switch element has a failure in the energized state when the voltage value detected by the voltage sensor is equal to a voltage value of the power supply, and
the controller is configured to output a control signal for setting the first switch element to the energized state and a control signal for setting the second switch element to the non-energized state, and the controller is configured to determine that the second switch element has a failure in the energized state when the voltage value detected by the voltage sensor is equal to the voltage value of the power supply.

4. The electrical storage system according to claim 1, wherein
the first switch element is provided in the first power line between the power supply and the second switch element,
the sensor includes a current sensor provided in the first power line between the second switch element and the coil, the current sensor is configured to detect an energized state of the first power line,
the controller is configured to output a control signal for setting the first switch element to the non-energized state and a control signal for setting the second switch element to the energized state, and the controller is configured to determine that the first switch element has a failure in the energized state when a detected result of the current sensor indicates the energized state of the first power line, and
the controller is configured to output a control signal for setting the first switch element to the energized state and a control signal for setting the second switch element to the non-energized state, and the controller is configured to determine that the second switch element has a failure in the energized state when a detected result of the current sensor indicates the energized state of the first power line.

5. The electrical storage system according to claim 1, wherein
the sensor includes a third voltage sensor configured to detect a voltage value between a ground and a part of the second power line, the second power line connects the second resistive element and the third switch element to the coil,
the controller is configured to output a control signal for setting the third switch element to the non-energized state, and the controller is configured to determine that the third switch element has a failure in the energized state when the voltage value detected by the third voltage sensor is higher than the voltage value at the time when the third switch element is in the non-energized state and is lower than a voltage value of the power supply, and the controller is configured to output a control signal for setting the third switch element to the energized state, and the controller is configured to determine that the second resistive element has a failure in a decreased resistance state when the voltage value detected by the third voltage sensor is equal to the voltage value of the power supply.

6. The electrical storage system according to claim 1, wherein the sensor includes a current sensor provided in the second power line, the current sensor is configured to detect an energized state of the second power line, and the controller is configured to output a control signal for setting the third switch element to the non-energized state, and the controller is configured to determine that the third switch element has a failure in the energized state when a detected result of the current sensor indicates the energized state of the second power line.

* * * * *